US010707806B2

(12) United States Patent
Yoon (10) Patent No.: US 10,707,806 B2
(45) Date of Patent: Jul. 7, 2020

(54) PANEL FOR INSTALLING SOLAR BATTERY MODULE (71) Applicants: I-SOLAR ENERGY CO., LTD., Goyang-si, Gyeonggi-do (KR); Yeseul Yoon, Goyang-si, Gyeonggi-do (KR)

(72) Inventor: Yeseul Yoon, Goyang-si (KR)

(73) Assignee: I-Solar Energy Co., LTD., Goyang-si, Gyeonggo-do (KR)

(*) Notice: Subject to any disclaimer, the term of this patent is extended or adjusted under 35 U.S.C. 154(b) by 0 days.

(21) Appl. No.: 15/560,865

(22) PCT Filed: Mar. 24, 2016

(86) PCT No.: PCT/KR2016/002982
§ 371 (c)(1),
(2) Date: Sep. 22, 2017

(87) PCT Pub. No.: WO2016/153285
PCT Pub. Date: Sep. 29, 2016

(65) Prior Publication Data
US 2018/0123506 A1 May 3, 2018

(30) Foreign Application Priority Data

Mar. 24, 2015 (KR) .................. 10-2015-0040951

(51) Int. Cl.
*H02S 30/10* (2014.01)
*H02S 20/23* (2014.01)
(Continued)

(52) U.S. Cl.
CPC ............. *H02S 30/10* (2014.12); *E04B 7/22* (2013.01); *E04D 3/30* (2013.01); *E04D 3/35* (2013.01);
(Continued)

(58) Field of Classification Search
CPC ........ H02S 30/10; H02S 40/34; H02S 40/425; E04D 3/30; E04D 3/35; E04D 3/36; E04D 3/351; E04D 3/363
(Continued)

(56) References Cited

U.S. PATENT DOCUMENTS 6,065,256 A 5/2000 Joko et al.
8,549,800 B2 10/2013 Reyal et al.
(Continued)

FOREIGN PATENT DOCUMENTS

CN 101138097 3/2008
CN 202062319 U 12/2011
(Continued)

OTHER PUBLICATIONS

International Search Report from the parent PCT Application No. PCT/KR2016/002982, 2 pages (dated Jun. 27, 2016, with English translation).
(Continued)

*Primary Examiner* — Magali P Slawski
*Assistant Examiner* — Kourtney R S Carlson
(74) *Attorney, Agent, or Firm* — Klarquist Sparkman, LLP (57) ABSTRACT A panel for installing a solar battery module according to an embodiment of the present invention comprises: a first connection portion, which protrudes upwards from one widthwise end of a panel; a second connection portion, which protrudes upwards from the other widthwise end of the panel, and which is fitted to a first connection portion of an adjacent panel in the upward/downward direction; a pair of coupling protrusions bent upwards inside the first connection portion and inside the second connection portion; and a seating portion formed between the coupling protrusions, solar battery modules being installed on the seating
(Continued)

portion, wherein the coupling protrusions are bent in the direction in which the solar battery modules are provided, such that the solar battery modules can be pressurized and fixed.

13 Claims, 6 Drawing Sheets (51) Int. Cl.
 *H02S 40/34*  (2014.01)
 *H02S 40/42*  (2014.01)
 *E04D 3/35*  (2006.01)
 *E04D 3/36*  (2006.01)
 *E04D 3/363*  (2006.01)
 *E04D 3/361*  (2006.01)
 *E04D 3/30*  (2006.01)
 *E04B 7/22*  (2006.01)
 *F16B 5/00*  (2006.01)

(52) U.S. Cl.
 CPC ............... *E04D 3/36* (2013.01); *E04D 3/361* (2013.01); *E04D 3/363* (2013.01); *F16B 5/0096* (2013.01); *H02S 20/23* (2014.12); *H02S 40/34* (2014.12); *H02S 40/425* (2014.12); *Y02B 10/12* (2013.01)

(58) Field of Classification Search
 USPC .................................................. 136/242–265
 See application file for complete search history.

(56) References Cited

U.S. PATENT DOCUMENTS

| | | | |
|---|---|---|---|
| 8,701,254 B2 | 4/2014 | Lin | |
| 2009/0165843 A1* | 7/2009 | Horioka | ................... H02S 30/10 |
| | | | 136/251 |
| 2009/0229654 A1* | 9/2009 | Morita | ..................... H02S 30/10 |
| | | | 136/251 |
| 2011/0073733 A1 | 3/2011 | Hartelius et al. | |
| 2011/0162639 A1 | 7/2011 | Jeandeaud | |
| 2012/0160787 A1* | 6/2012 | Schummlochner | ... F24S 80/453 |
| | | | 211/41.1 |
| 2016/0079910 A1* | 3/2016 | Sung | ....................... H02S 20/23 |
| | | | 136/251 |

FOREIGN PATENT DOCUMENTS

| | | |
|---|---|---|
| CN | 102639798 A | 8/2012 |
| CN | 203687423 U | 7/2014 |
| CN | 107131664 | 9/2017 |
| DE | 19851230 | 5/1999 |
| DE | 202010020391 U1 | 6/2011 |
| EA | 200970983 | 4/2010 |
| EP | 2423405 | 2/2012 |
| JP | 2000-274017 A | 10/2000 |
| JP | 2012-102587 | 5/2012 |
| JP | 2015-010420 | 1/2015 |
| KR | 20-0410707 | 3/2006 |
| KR | 10-2010-0006921 | 1/2010 |
| KR | 20-2014-0000603 | 1/2014 |
| RU | 235820 | 6/2009 |
| WO | WO2009/153497 | 12/2009 |
| WO | WO2010/058044 | 5/2010 |

OTHER PUBLICATIONS

Notice of Allowance from KR 10-2015-0040951, 3 pages (dated Aug. 30, 2016).
Written Opinion from the parent PCT Application No. PCT/KR2016/002982, 4 pages (dated Jun. 27, 2016).
Federal Service for Intellectual Property (Rospatent), Office Action, dated Jun. 18, 2018, issued in Russian Federation Patent Application No. 2017134457.
Extended European Search Report for European Patent Application No. 16769103.9, dated Nov. 28, 2018.
National Intellectual Property Administration, Office Action dated Aug. 17, 2018, issued in China Patent Application No. 201680018202.26.
Japan Patent Office, Office Action dated Sep. 5, 2018, issued in Japan Patent Application No. 2018-501840.
Office Action for Chinese Patent Application No. 201680018202.6, dated Jan. 2, 2020.

\* cited by examiner

PANEL FOR INSTALLING SOLAR BATTERY MODULE

CROSS-REFERENCE TO RELATED APPLICATIONS

This is the U.S. National Stage of International Application No. PCT/KR2016/002982, filed Mar. 24, 2016, which claims priority to and the benefit of Korean Patent Application No. 10-2015-0040951, filed Mar. 24, 2015, all of which applications are herein incorporated by reference in their entireties.

TECHNICAL FIELD

The present invention relates to a panel for installing solar battery modules.

BACKGROUND ART

Various methods of installing solar battery modules at the roofs or rooftops of buildings or the ground for photovoltaic power generation have been introduced. An example of these conventional solar battery modules is disclosed in JP 2007-51478 (published on Mar. 1, 2007).

As thin-film solar battery modules have recently been developed and used, methods of directly attaching a thin-film solar battery module to a roof panel have been introduced. However, when a thin-film solar battery module is attached to a roof panel using an adhesive, there is a problem in that the solar battery module is easily separated and detached from the metal roof panel due to the difference in thermal expansion coefficient between the solar battery module and the metal roof panel.

Research into a panel for installing a solar battery module to increase the power generation efficiency of solar batteries by effectively discharging heat from the solar battery module is desired.

DETAILED DESCRIPTION OF THE INVENTION

Technical Problem

The objective of the present invention is to provide a panel for installing a solar battery module, thereby facilitating the installation of the solar battery module and maintaining the efficiency of power generation of a solar battery high.

Technical Solution

According to an aspect of the inventive concept, there is provided a panel for installing a solar battery module. The panel includes a first connection portion (11) protruding upwards from one widthwise end of a panel (10); a second connection portion (12) protruding upwards from the other widthwise end of the panel (10) and being fitted to a first connection portion of an adjacent panel in an upward/downward direction; a pair of coupling protrusions (14, 15) bent upwards inside the first connection portion and inside the second connection portion (12); and a seating portion (16) formed between the coupling protrusions (14, 15), where a solar battery module (4, 6) is installed at the seating portion (16). The coupling protrusions (14, 15) may be bent in a direction in which the solar battery module (4, 6) is provided so that the solar battery module (4, 6) is pressed down and fixed.

At least one concave section (19, 20) recessed downwards may be formed at a bottom surface between seating portions (16) to extend in a lengthwise direction.

A wire (22) electrically connecting the solar battery module (4, 6) with an external electronic device may be installed at the concave section (19, 20).

The panel may further include a stopper (18) formed by bending a portion of each coupling protrusion (14, 15) further in the direction, in which the solar battery module (4, 6) is provided, than the other portion of the coupling protrusion (14, 15) is bent. The stopper (18) may catch an end of the solar battery module (4, 6) to fix the solar battery module.

The stopper (18) may be formed by partially cutting the coupling protrusion (14, 15).

At least part of the stopper (18) may be disposed at a side of the solar battery module (4, 6).

Alternatively, the panel may further include a stopper (18a) formed by bending a lengthwise end portion of the seating portion (16) upwards. The stopper (18a) may catch an end of the solar battery module (4, 6) to fix the solar battery module.

A pressing projection (17) may be formed to protrude from an inside of the fore end of each coupling protrusion (14, 15) and the pressing projection (17) may press down the solar battery module (4, 6) when the coupling protrusion (14, 15) is bent.

The coupling protrusions (14, 15) may be bent inward and the solar battery module (4, 6) may be slid between the coupling protrusions (14, 15) and the panel (10) to be combined with the panel 10.

As another alternative, the panel may further include a stopper (18, 18a) formed by bending a portion of each coupling protrusion (14, 15) further in the direction, in which the solar battery module (4, 6) is provided, than the other portion of the coupling protrusion (14, 15) is bent or by bending a lengthwise end portion of the seating portion (16) upwards. The stopper (18, 18a) may be in contact with an end of the solar battery module (4, 6) to stop an escape of the solar battery module (4, 6).

Advantageous Effects of the Invention

According to an embodiment of the present invention, solar battery modules (4, 6) can be quickly and easily installed due to the structure of first and second connection portions (11, 12), so that cost of installing the solar battery modules (4, 6) can be decreased.

In addition, the solar battery modules (4, 6) are cooled through concave sections (19, 20), so that the power generation efficiency of the solar battery modules can be increased.

Furthermore, a wire (22) connected to the solar battery modules (4, 6) is installed at one of the concave sections (19, 20), so that the wire (22) of the solar battery modules (4, 6) is not exposed outside.

Meanwhile, a stopper (18) formed by bending a lengthwise end portion of a coupling protrusion (14, 15) further than the other portion is bent or a stopper (18a) formed by bending upwards a lengthwise end portion of a seating portion (16) is provided, so that the solar battery modules (4, 6) are effectively prevented from escaping from their regular positions. In addition, a pressing projection (17) is formed at an inside of the fore end of the coupling protrusion (14) so that the pressing projection (17) presses further down an edge of the solar battery modules (4, 6) when the coupling protrusion (14) is bent. Accordingly, the pressing projection (17) presses further down the edge of the solar battery modules (4, 6) when the coupling protrusion (14, 15) is bent, so that the solar battery modules (4, 6) can be strongly bonded to a panel (10). As a result, a solar battery module is effectively prevented from escaping from the panel (10).

BEST MODE

Before setting forth the detailed description of the present invention, it will be understood that since the embodiments described herein and the structures illustrated in the accompanying drawings show only the best mode of the present invention and do not represent all of the technical ideas of the present invention, there will be various equivalents and modifications which can replace the embodiments and the structures at the time of filing the application.

Figure 1:
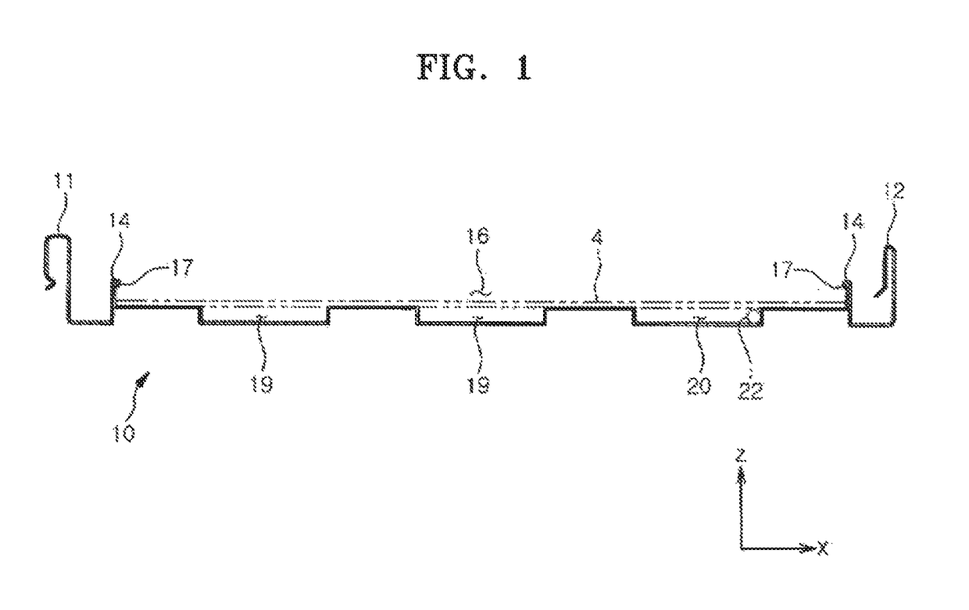
FIG. 1 is a cross-sectional view of an embodiment of the present invention.
Figure 2:
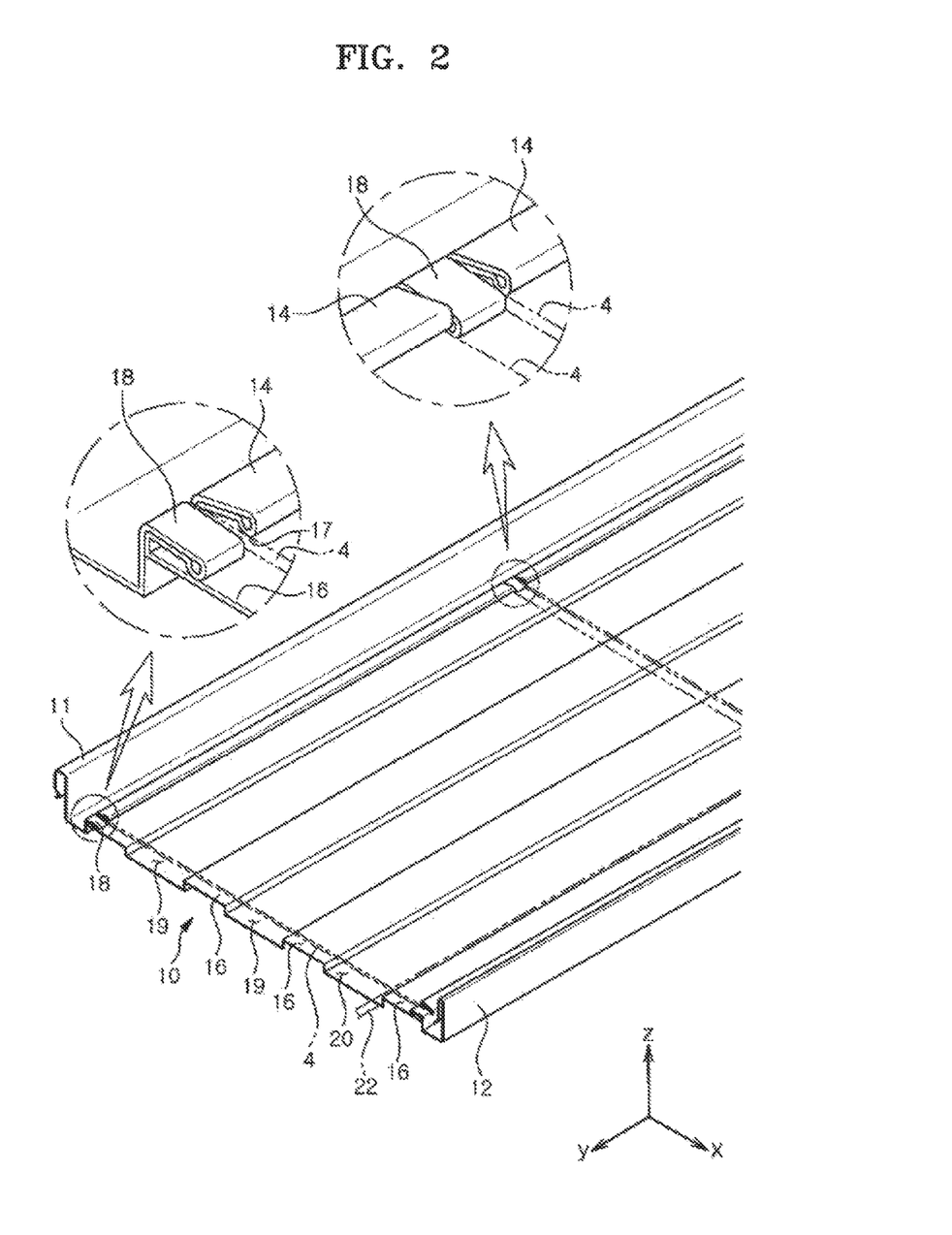
FIG. 2 is a perspective view of the construction of the embodiment illustrated in FIG. 1.

Hereinafter, the embodiments of the present invention will be described with reference to the accompanying drawings. FIG. 1 is a cross-sectional view of an embodiment of the present invention. FIG. 2 is a view of a state in which a thin-film solar battery module illustrated in FIG. 1 is constructed. As illustrated in FIGS. 1 and 2, according to an embodiment of the present invention, a panel for installing a solar battery module may include a panel 10 manufactured by continuously roll-forming a metal panel supplied in a coil form, a first connection portion 11 which protrudes upwards from one widthwise end of the panel 10, and a second connection portion 12 which protrudes upwards from the other widthwise end of the panel 10 and which is fitted to a first connection portion (not shown) of an adjacent panel (not shown) in the upward/downward direction. The panel 10 may be a roof panel or a wall panel but is not limited thereto. The shape of the first connection portion 11 and the second connection portion 12 may vary. According to the embodiment of the present invention, the panel 10 may be used at the rooftops of buildings, on the ground, on the water surface, or at other appropriate places where solar battery modules can be installed.

The terms about directions will be defined here: a widthwise direction refers to an x-axis direction in FIG. 2 and a lengthwise direction refers to a y-axis direction in FIG. 2.

According to the embodiment of the present invention, a pair of coupling protrusions 14 or 15 bent upwards along the lengthwise direction may be provided inside the first and second connection portions 11 and 12. A bottom surface inside the coupling protrusions 14 or 15 may form a seating portion 16 at which a solar battery module 4 or 6 is disposed and seated. Accordingly, a distance between the pair of coupling protrusions 14 or 15 may be configured to correspond to the width of the solar battery module 4 which will be installed. A pressing projection 17 may be formed at the inside of the fore end of each coupling protrusion 14 or 15 by bending the panel. A portion of the coupling protrusion 14 or 15 may form a stopper 18. For example, the stopper 18 may be formed by bending a lengthwise end portion of the coupling protrusion 14 or 15 further inward (i.e., downwards in the z-axis direction in FIG. 2) than the other portion of the coupling protrusion 14 or 15 is bent. The stopper 18 may be formed by partially cutting the end portion of the coupling protrusion 14 or 15. When a plurality of solar battery modules 4 or 6 are installed at the panel 10 since the panel 10 is long, the stopper 18 may also be formed in the middle of the coupling protrusion 14 or 15. The stopper 18 formed in the middle of the coupling protrusion 14 or 15 may be in contact with an end of a solar battery module 4 placed in the middle of the panel 10 to support the solar battery module 4.

Figure 5:
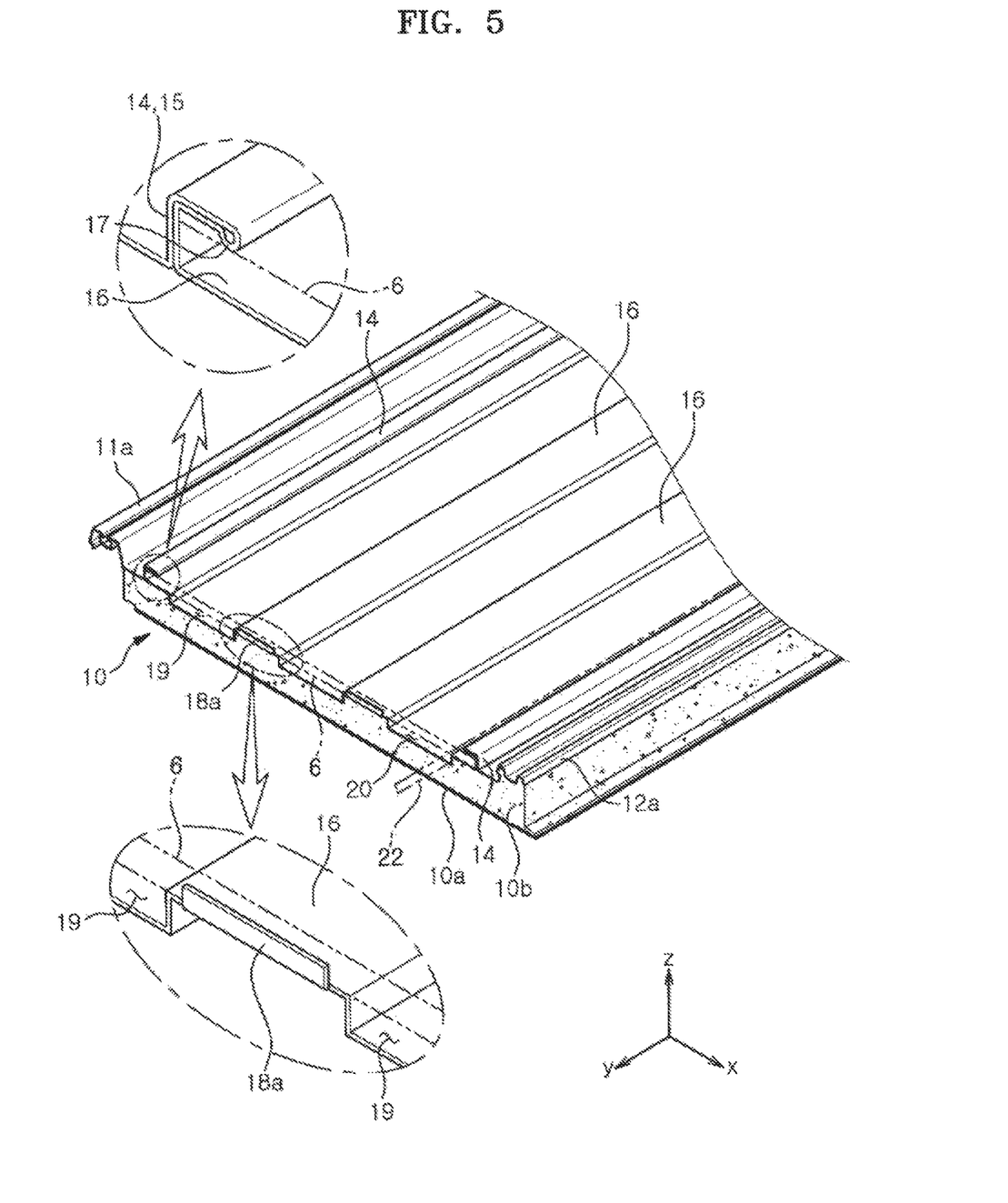
FIG. 5 is a perspective view of yet another embodiment of the present invention.

The stopper 18 may be formed by bending a lengthwise end portion of the seating portion 16 upwards in the z-axis direction (see FIG. 5). The shape of the stopper 18 is not limited to the embodiments illustrated in the drawings and may vary.

According to the embodiment of the present invention, one or more concave sections 19 and 20 recessed downwards may be formed at the bottom surface of the seating portion 16 in the lengthwise direction of the panel. Since external air or coolant passes through the concave sections 19 and 20, heat generated during the operation of the solar battery module 4 may be quickly cooled down. Accordingly, the power generation efficiency of a solar battery may be maintained at a high level. A wire electrically connecting the solar battery module 4 with an external electronic device may be installed at one concave section 20 among the concave sections 19 and 20. For example, a wire 22 electrically connecting the solar battery module 4 with a controller, a battery, or an inverter may be installed at the concave section 20.

When the solar battery panel 4 is installed, an adhesive may be applied to the seating portion 16 of the panel 10 or the back side of the solar battery module 4, and the solar battery module 4 may be placed on and pressed onto the seating portion 16 of the panel 10.

Thereafter, the coupling protrusion 14 or 15 may be bent toward the solar battery module 4 at about a right angle to press and fix the edge of the solar battery module 4. At this time, the stopper 18 may be formed by bending a lengthwise end portion of the coupling protrusion 14 or 15 further in the direction in which the solar battery module 4 is provided. At this time, the stopper 18 may be formed by partially cutting and bending the lengthwise end portion of the coupling protrusion 14 or 15. The stopper 18 may be provided at other portions beside the lengthwise end portion of the panel 10. In other words, the stopper 18 may also be formed in the middle of the coupling protrusion 14 or 15 where an end of the solar battery panel 4 is positioned, taking the size of the solar battery panel 4 into account. The end of the solar battery module 4 or 6 may be caught by the stopper 18, so that the stopper 18 prevents the solar battery module 4 or 6 from escaping. In other words, at least part of the stopper 18 may be disposed at the side of the end portion of the solar battery module 4 or 6 to restrain the movement of the solar battery module 4 or 6. As a result, even when the panel 10 is used at a slanting roof and the solar battery module 4 is detached from the seating portion 16 and an adhesive part due to a difference in a thermal expansion coefficient, the solar battery module 4 is prevented from escaping or sliding down from the panel 10 by the contacting pressure of the coupling protrusion 14 or 15 and the mechanical trapping effect of the stopper 18.

Figure 3:
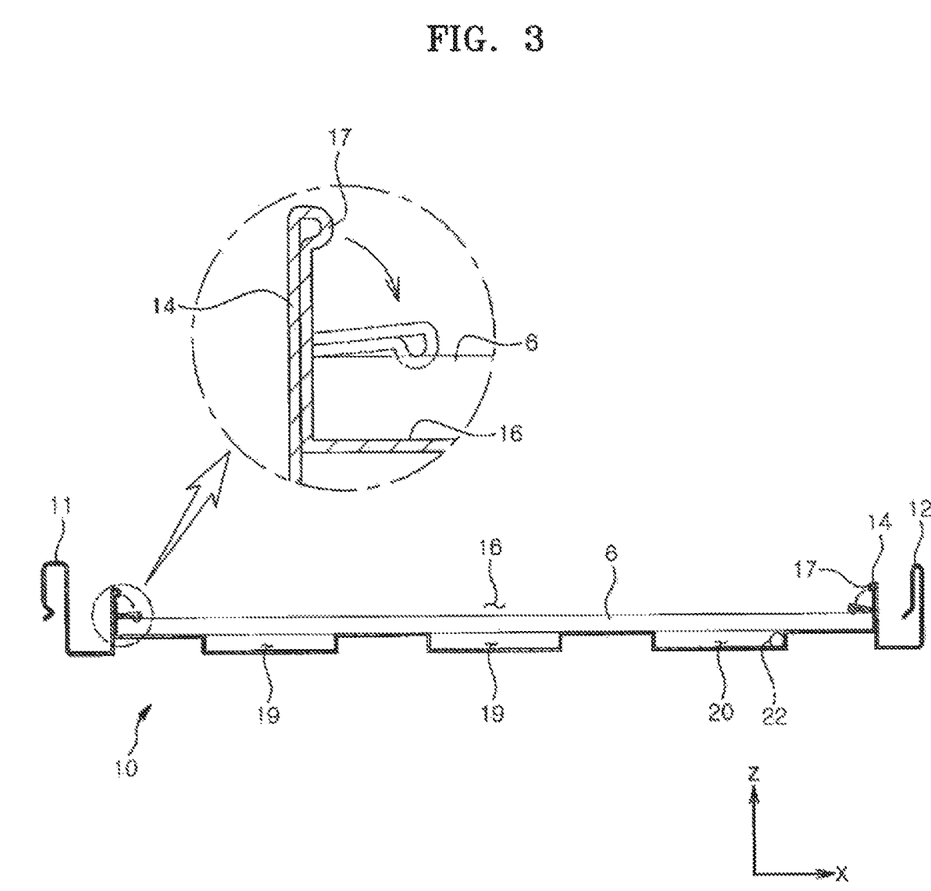
FIG. 3 is a cross-sectional view of another embodiment of the present invention.

FIG. 3 shows a case where a board-type or crystalline solar battery module 6 relatively thicker than a thin-film solar battery module is installed at the panel 10, in another embodiment of the present invention. The present invention may be applied regardless of the type or thickness of solar battery modules. In other words, when a position at which the coupling protrusion 14 or 15 is bent is adjusted, a panel for installing a solar battery module according to an embodiment of the present invention may be used for solar battery modules having different thicknesses.

Figure 4:
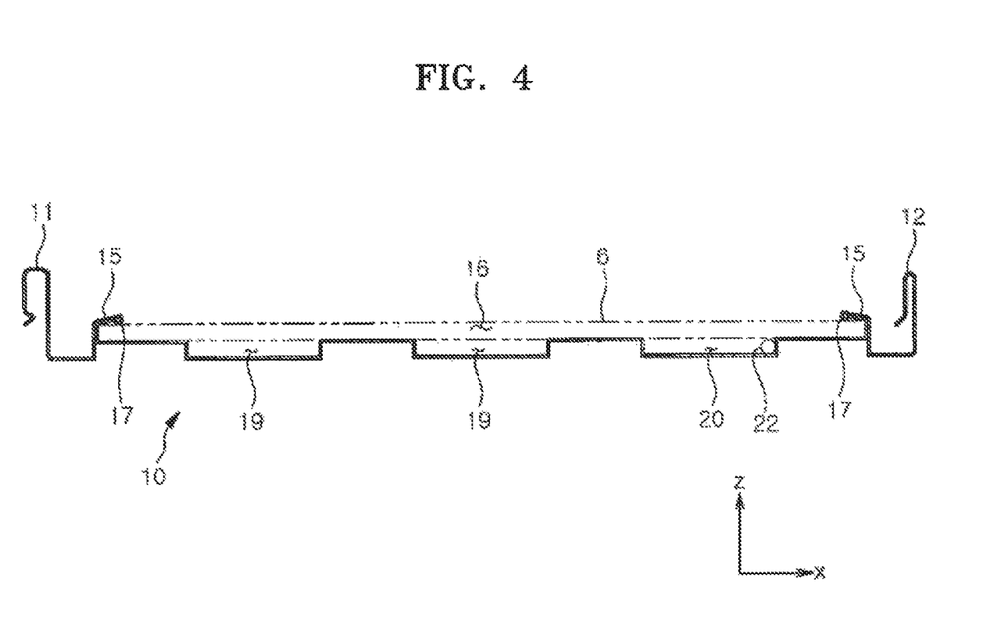
FIG. 4 is a cross-sectional view of still another embodiment of the present invention.

FIG. 4 shows still another embodiment of the present invention, in which upper ends of the respective coupling protrusions 14 or 15 may be bent to approach and face each other in advance. In the current embodiment, an adhesive may be applied to the seating portion 16 and the solar battery module 4 may be slid between the coupling protrusions 14 or 15 to be coupled thereto. The stopper 18 may be disposed at a lower end of the solar battery module 4, as shown in FIG. 2, to restrict the lower end position of the solar battery module. Accordingly, even when the solar battery module 4 is detached from the seating portion 16 of the panel 10, the solar battery module 4 is prevented from sliding down due to the stopper 18.

FIG. 5 shows yet another embodiment of the present invention, in which first and second connection portions 11a and 12a may have a mountain shape having a recessed channel at the top. A stopper 18a may be formed by bending upwards a lengthwise end portion of the seating portion 16 between the coupling protrusions 14 or 15 of the panel 10. The stopper 18a may be in contact with the side of one end portion of the solar battery module 4 or 6. In other words, at least part of the stopper 18a may be disposed at the side of the end portion of the solar battery module 6, thereby restraining the movement of the solar battery module 6. As a result, the stopper 18a may prevent the solar battery module 6 from escaping or sliding down from its regular position due to decrease in adhesiveness between the solar battery module 6 and the panel 10. A facing panel 10a and an insulator 10b may be combined with the bottom of the panel 10 to form a sandwich panel.

Figure 6:
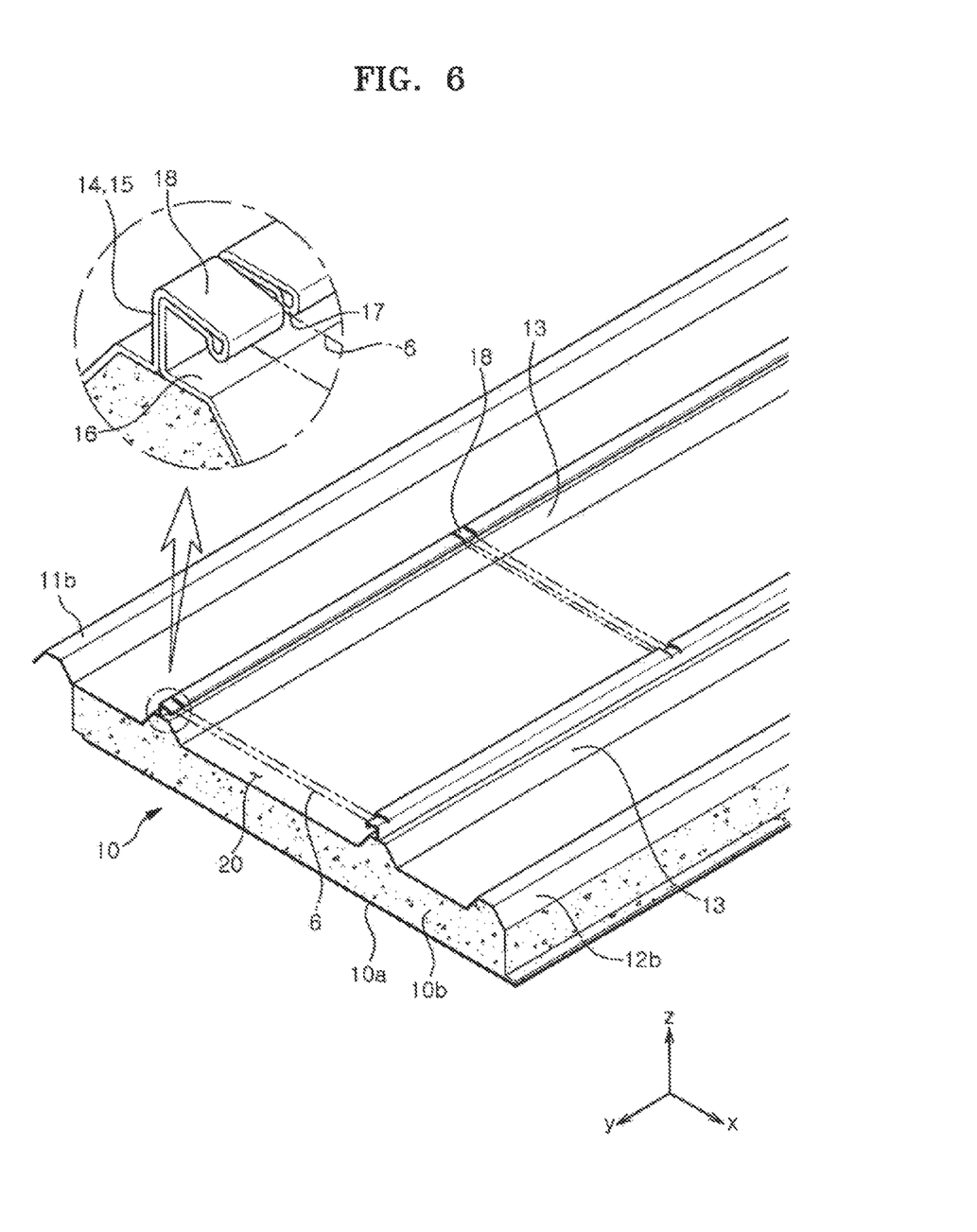
FIG. 6 is a perspective view of a further embodiment of the present invention.

FIG. 6 shows a further embodiment of the present invention. According to the current embodiment, a panel for installing a solar battery module may include the panel 10a facing the bottom of the panel 10 and the insulator 10b between the panel 10 and the panel 10a facing the panel 10. In other words, a panel for installing a solar battery module according to the current embodiment may be applied to a sandwich panel. In the current embodiment, connection portions 11b and 12b may be formed in a mountain shape. A pair of the coupling protrusions 14 or 15 may be respectively formed at mount portions 13 which respectively protrude in one shape at the inner sides of the respective connection portions 11b and 12b. The seating portion 16 may be formed on the flat part at the top of each mount portion 13. As described above, the shape of the connection portion 11a or 11b connecting panels 10 may vary. Existence or non-existence of the insulator 10b or the facing panel 10a at the bottom of the panel 10 or the type or shape thereof may be selected appropriately.

While this invention has been particularly shown and described with reference to preferred embodiments thereof, it will be understood by those skilled in the art that various changes in form and details may be made therein without departing from the spirit and scope of the invention. Therefore, these changes will be construed as being included in the scope of the appended claims.

The invention claimed is:

1. A solar battery module assembly, comprising:
   a solar battery module;
   a panel for supporting the solar battery module, the panel comprising:
      a first connection portion protruding upwards from one widthwise end of a panel;
      a second connection portion protruding upwards from the other widthwise end of the panel and being fittable to a first connection portion of an adjacent panel in an upward/downward direction;
      a pair of coupling protrusions extending upwards and positioned inwardly of the first connection portion and inwardly of the second connection portion, respectively, the coupling protrusions being parallel to a lengthwise direction;
      a seating portion formed between the coupling protrusions; and
      a pair of stoppers defined in the pair of coupling protrusions, respectively, wherein each of the pair of stoppers is a portion of the respective coupling protrusion,
   wherein the solar battery module is received in the seating portion formed between the coupling protrusions, the coupling protrusions being bent downwardly to hold the solar battery module within the seating portion, and
   wherein each of the stoppers is separately bendable downwards towards the seating portion and to a stopper position below an outwardly facing surface of the solar battery module received in the seating portion and adjacent an end thereof to stop lengthwise movement thereof relative to the coupling protrusions.

2. The solar battery module assembly of claim 1, wherein at least one concave section recessed downwards is formed at a bottom surface between two adjacent seating portions to extend in the lengthwise direction.

3. The solar battery module assembly of claim 2, wherein a wire configured for electrically connecting the solar battery module with an external electronic device is installed at the at least one concave section.

4. The solar battery module assembly of claim 1, wherein the stoppers are formed by partially cutting the respective one of the coupling protrusions.

5. The solar battery module assembly of claim 1, wherein at least part of each of the stoppers is disposed at a side of the seating portion.

6. The solar battery module assembly of claim 4, wherein at least part of each of the stoppers is disposed at a side of the seating portion.

7. The solar battery module assembly of claim 1, further comprising at least one second stopper formed by bending a lengthwise end portion of the seating portion upwards, wherein the second stopper is positioned to block an end of the solar battery module to stop the solar battery module from moving in the lengthwise direction.

8. The solar battery module assembly of claim 1, wherein a pressing projection is formed to protrude from an inside of the fore end of each coupling protrusion and the pressing projection presses down the solar battery module when the coupling protrusion is bent.

9. The solar battery module assembly of claim 1, wherein the coupling protrusions are bent inward, and wherein the solar battery module is slid between the coupling protrusions and the panel to be coupled with the panel.

10. The solar battery module assembly of claim 9, further comprising at least one second stopper formed by bending a lengthwise end portion of the seating portion upwards, wherein the second stopper is in contact with an end of the solar battery module to stop of the solar battery module from moving in the lengthwise direction.

11. The solar battery module assembly of claim 1, wherein the solar battery module is provided as a thin-film type or a board type.

12. A solar battery module assembly, comprising:
   a solar battery module;
   a panel for supporting the solar battery module, the panel comprising:
      a first connection portion protruding upwards from one widthwise end of a panel;
      a second connection portion protruding upwards from the other widthwise end of the panel and being fittable to a first connection portion of an adjacent panel in an upward/downward direction;
      a pair of coupling protrusions extending upwards and positioned inwardly of the first connection portion and inwardly of the second connection portion, respectively, the coupling protrusions being parallel to a lengthwise direction;
      a seating portion formed between the coupling protrusions; and
      a pair of stoppers defined in the pair of coupling protrusions, respectively, wherein each of the pair of stoppers is a portion of the respective coupling protrusion, and
   wherein the solar battery module is received in the seating portion formed between the coupling protrusions, the coupling protrusions being bent downwardly to hold the solar battery module within the seating portion, and
   wherein each of the stoppers is separately bent downwards towards the seating portion by an angle greater than the respective coupling protrusion.

13. The solar battery module assembly of claim 12, wherein the remaining portion of the respective coupling protrusion is bent toward the seating portion at about a right angle.

* * * * *